(No Model.)
F. M. ASHLEY.
STEAM BOILER.
No. 500,733. Patented July 4, 1893.
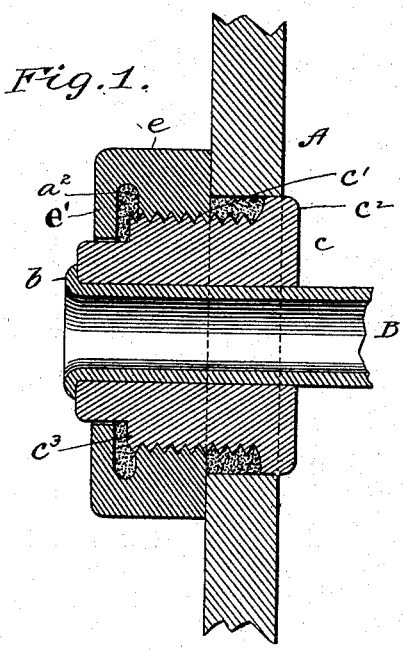
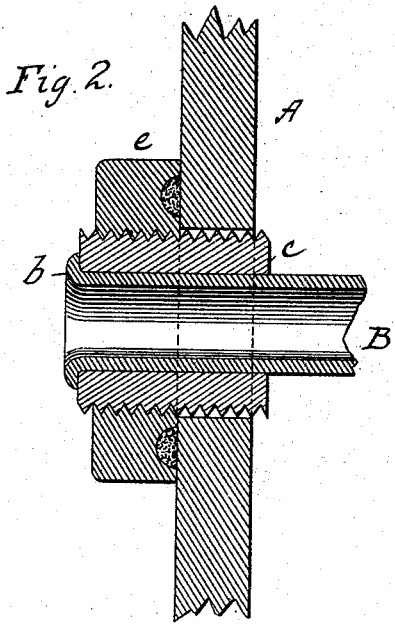
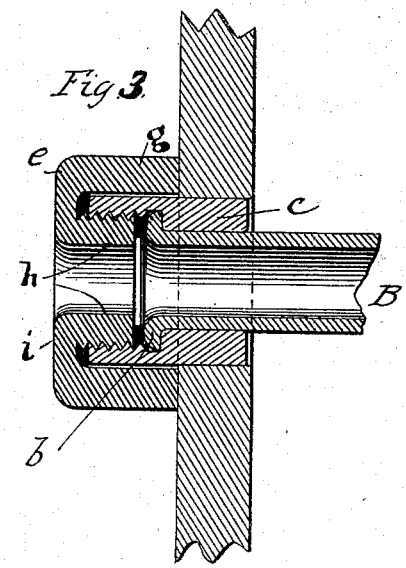
WITNESSES:
Frank S. Ober.
Jr. J. Uhl.
INVENTOR
Frank M. Ashley
BY
Wm. A. Rosenbaum
ATTORNEY

UNITED STATES PATENT OFFICE.

FRANK M. ASHLEY, OF HAWTHORNE, NEW JERSEY.

STEAM-BOILER.

SPECIFICATION forming part of Letters Patent No. 500,733, dated July 4, 1893.

Application filed December 27, 1892. Serial No. 456,331. (No model.)

*To all whom it may concern:*

Be it known that I, FRANK M. ASHLEY, a citizen of the United States, residing at Hawthorne, in the county of Passaic and State of New Jersey, have invented certain new and useful Improvements in Steam-Boilers, of which the following is a full, clear, and exact description.

This invention relates to steam boilers, the object being to provide means whereby boiler tubes may be inserted and removed from the tube sheets without cutting off the bead on the end of the tube as is customarily done. In other words, my invention provides a separable joint between the tube and the tube sheet.

In the accompanying drawings, Figures 1, 2, and 3 illustrate different forms of my invention all constructed on the same principle.

A represents the tube sheet of a boiler.

B represents the tube. The ordinary method of adjusting this tube is to pass the end of the tube through a hole in the tube sheet which it fits tightly, and then forming or upsetting an outer flange or burr on the end of the tube, which overlaps the tube sheet and secures the tube in the sheet after the manner of the rivet. My invention comprehends this flange or bead and it is represented in the drawings by the letter $b$; the bead, however, is formed upon the tube before it is adjusted to the boiler. I place upon the end of the tube immediately back of the bead a threaded sleeve or collar $c$. This collar is preferably made as shown in Fig. 1; it is provided with an external screw thread $c'$ and with an annular flange $c^2$ at its inner end. The forward end of the collar is preferably contracted to form a shoulder $c^3$ and the extreme forward end of the nut bears against the back of the bead $b$; the collar fits as closely as possible upon the tube. The hole in the tube sheet instead of being made of the same diameter as the tube is made enough larger to receive this collar and as shown in Fig. 1, the flange $c^2$ enters a short distance into the hole in the tube sheet.

$e$ is a nut having a thread corresponding to that of the collar. It is provided with an internal shoulder $e'$ which, when the nut is screwed upon the collar is parallel to and opposite the shoulder $c^3$ on the collar. The nut is also provided with an internal cavity $a^2$ formed at the inner end of its thread. Before the end of the tube with the collar in place is inserted through the opening in the tube sheet, any suitable packing material is filled into the space between the flange $c^2$, the thread of the collar, and the boundary of the opening in the tube sheet and also in the cavity $c^2$ of the nut. The nut is then screwed upon the outer end of the collar and, through the purchase which it has against the tube sheet, the tube is drawn in a longitudinal direction until the joint is tight, the collar being forced against the bead on the end of the tube and tightening the joint at that point. In this operation the packing in the two cavities is also compressed and the entire joint made secure. It will be observed that the threaded surfaces are well protected against the fire and the water. To remove the tube it is not necessary to cut the bead off, as is ordinarily practiced, but simply to unscrew the nut, when the end of the tube may be withdrawn from the tube sheet. With this construction the tubes of a boiler may be removed and replaced as often as desired and if the bead on the end of the tube is destroyed by corrosion it is only necessary to cut off the outer end of the collar sufficiently to shorten the tube and bend over a new bead.

In Fig. 2 the collar and nut are provided and the parts are put together in substantially the same manner as shown in Fig. 1, but in this form the thread is not so well protected.

In Fig. 3, I have shown a good form, in which the collar projects beyond the end of the tube and the projecting portion is internally threaded. The nut is formed of two concentric cylindrical portions $g$ and $h$ connected by a web $i$ and with sufficient space between them to admit the projecting end of the collar. The inner cylinder of the nut is threaded externally and engages with the thread on the collar. The opening through the center of the nut forms an extension of the tube. Packing material is inserted at the two points indicated and thoroughly protects the thread. In this form also the bead on the end of the tube is protected and would seldom if ever have to be renewed. The invention is likewise subject to many modifications.

Having described my invention, I claim—

1. In steam boilers, the combination with a tube provided on its end with a bead, and a tube sheet, of a collar surrounding the tube and bearing against the bead and a nut engaging with the collar and bearing against the tube sheet, whereby the tube is secured by a brace acting longitudinally.

2. In steam boilers, the combination with a tube provided on its end with a bead, and a tube sheet, of a collar surrounding the tube and bearing against the bead and a nut engaging with the collar and bearing against the tube sheet, and packing interposed between the nut and collar, substantially as described.

3. The combination with a tube and a tube sheet, of a collar surrounding the tube and occupying an opening in the tube sheet, and a nut engaging with the collar and bearing against the tube sheet to tighten the joint, substantially as described.

4. The combination of a tube provided with a bead at its end, a threaded collar surrounding the tube and resting at one end against the bead and provided at the other end with a flange, a tube sheet provided with an opening inclosing said flange and a nut engaging with the thread on the collar and bearing against the tube sheet and packing material inserted between the tube sheet, nut and collar.

In testimony whereof I subscribe my signature in presence of two witnesses.

FRANK M. ASHLEY.

Witnesses:
  Jos. J. Uhl,
  Mrs. F. M. Ashley.